US010336542B2

(12) United States Patent
Garrett et al.

(10) Patent No.: US 10,336,542 B2
(45) Date of Patent: Jul. 2, 2019

(54) SYSTEMS AND METHODS FOR MAXIMIZING TOTE CONTENTS

(71) Applicant: Amazon Technologies, Inc., Seattle, WA (US)

(72) Inventors: Samuel Gardner Garrett, Seattle, WA (US); John Stuart Battles, North Bend, WA (US); Timothy Alan Talda, Seattle, WA (US); Tyson Wittrock, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 46 days.

(21) Appl. No.: 15/355,974

(22) Filed: Nov. 18, 2016

(65) Prior Publication Data

US 2018/0141754 A1 May 24, 2018

(51) Int. Cl.

| | |
|---|---|
| ***G06F 7/00*** | (2006.01) |
| ***B65G 1/137*** | (2006.01) |
| ***B65G 47/52*** | (2006.01) |
| ***B65G 65/00*** | (2006.01) |

(52) U.S. Cl.

CPC .......... *B65G 1/1373* (2013.01); *B65G 47/52* (2013.01); *B65G 65/00* (2013.01); *B65G 2209/06* (2013.01)

(58) Field of Classification Search

None

See application file for complete search history.

(56) References Cited

U.S. PATENT DOCUMENTS

| | | | | |
|---|---|---|---|---|
| 5,515,664 A * | 5/1996 | Tanaka | B65B 5/06 53/243 |
| 5,615,993 A * | 4/1997 | Tanaka | B65G 1/1376 414/412 |
| 2013/0062160 A1 | 3/2013 | Steinbach et al. | |

(Continued)

FOREIGN PATENT DOCUMENTS

| | | |
|---|---|---|
| DE | 102015001540 | 8/2015 |
| EP | 2808276 | 12/2014 |
| FR | 1341242 | 10/1963 |

(Continued)

OTHER PUBLICATIONS

"Application Notes: Roller Conveyor", Schneider Electric 2003, Dec. 11, 2005, pp. 1-6, retreived from the internet on Nov. 9, 2017 at URL:http:static.schneider-electric.us/docs/MachineControl/0105DB0301.pdf.

(Continued)

*Primary Examiner* — Yolanda R Cumbess

(74) *Attorney, Agent, or Firm* — BakerHostetler

(57) ABSTRACT

An example system includes a conveyor configured to move a plurality of items, a ramp configured to support at least one item of the plurality of items as the at least one item is transferred from the conveyor to a tote, and a platform supported on a support surface and configured to support the tote at a location proximate the ramp. In some examples, the tote includes a base having a top surface defining at least part of an interior space of the tote. Further, the platform positions the tote such that the top surface of the base extends at an angle, relative to a horizontal plane, greater than approximately 5 degrees and less than approximately 10 degrees.

20 Claims, 5 Drawing Sheets

(56) References Cited

U.S. PATENT DOCUMENTS

2015/0144536 A1* 5/2015 Dugat ..................... B07C 5/36
209/2
2017/0057756 A1* 3/2017 Dugat .................. B65G 37/02

FOREIGN PATENT DOCUMENTS

JP 2010234835 10/2010
WO WO2016082883 6/2016

OTHER PUBLICATIONS

PCT Search Report and Written Opinion dated Feb. 22, 2018 for PCT application No. PCT/US2017/062024, 33 pages.

* cited by examiner

SYSTEMS AND METHODS FOR MAXIMIZING TOTE CONTENTS

BACKGROUND

Various systems, such as pick-to-order systems, may be used to fulfill complex orders in inventory storage, warehouse, shipping, or other environments. In such systems, totes, pods, or other containers may include items required to fulfill one or more orders in an order queue. Such items may be removed from the respective containers and disposed on one or more shuttles configured to transport the items to a desired location where the order can be further processed. In particular, such shuttles may transport the items to an empty tote associated with the order, and a conveyor on the shuttle may transfer the items from the shuttle to the empty tote, thereby at least partially filling the tote.

Although such systems may be useful in transporting inventory items during an order fulfilment process, existing systems are typically not configured to maximize the number of items transferred from the conveyor of the shuttle to an empty tote. Indeed, when transferring inventory items to an empty tote, such system are prone to unevenly distributing the inventory items within an inner space of the tote. As a result, such systems often underfill totes, thereby slowing the order fulfilment process and reducing efficiency. Further, unevenly distributing inventory items within the tote can, in some circumstances, result in damage to the inventory item and a temporary stoppage in the order fulfilment process.

BRIEF DESCRIPTION OF THE DRAWINGS

This detailed description makes reference to the accompanying figures. In the figures, the left-most digit(s) of a reference number identifies the figure in which the reference number first appears. The same reference numbers in different figures indicate similar or identical items.

DETAILED DESCRIPTION

Figure 1:
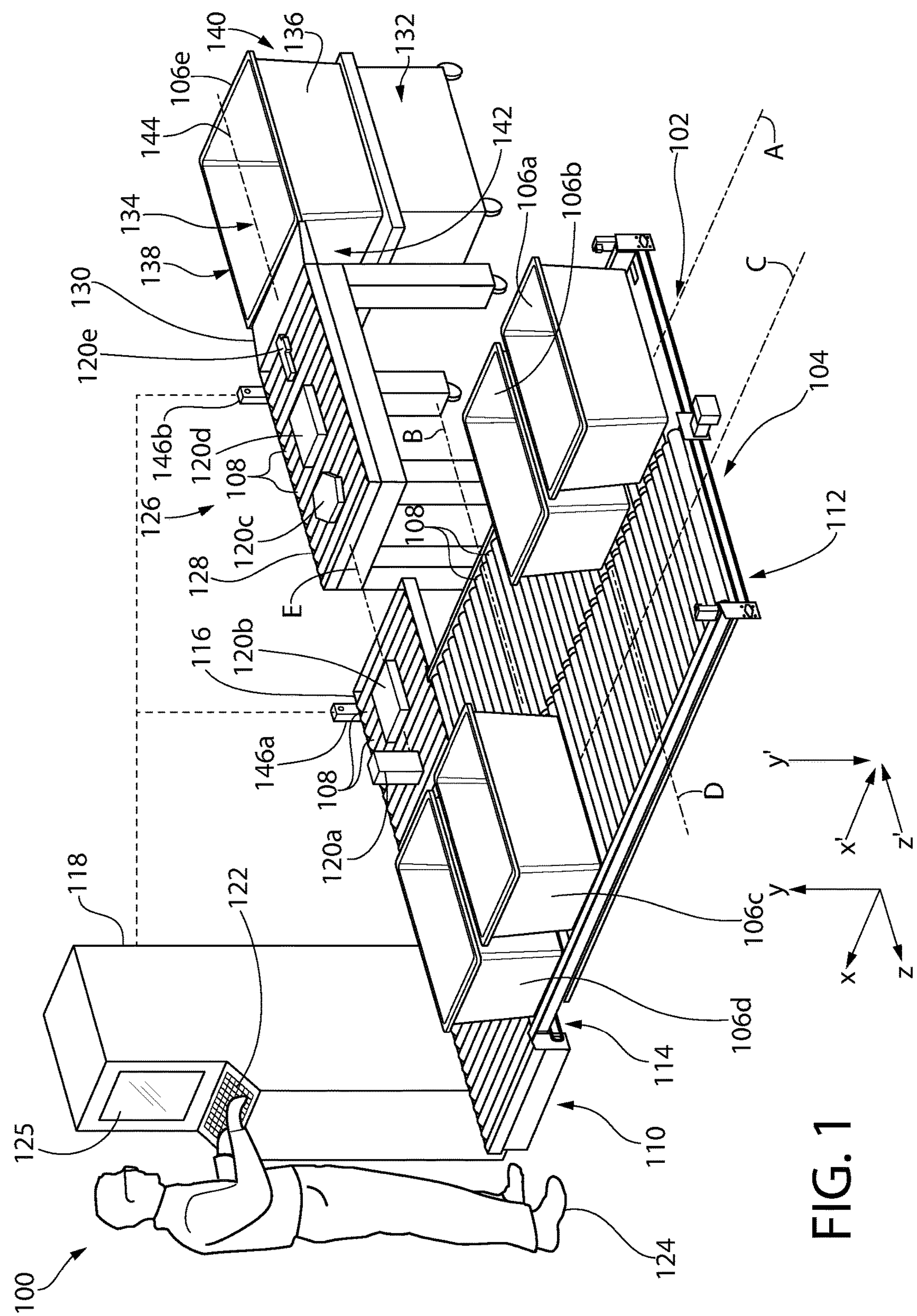
FIG. 1 is a perspective view of an example system of the present disclosure.

Described herein are systems, apparatuses, and methods related to controlling the movement and/or handling of inventory items within an order-fulfillment environment. The example systems of the present disclosure may be configured to transfer a plurality of items into an empty tote associated with an order. In particular, the example systems of the present disclosure may position the tote relative to one or more conveyors, ramps, support surfaces, and/or other components such that the number of items transferred into the tote from such system components is maximized, thereby increasing the overall efficiency of the system.

The example systems of the present disclosure may include a conveyor configured to support a plurality of inventory items, and to move the items in a direction toward the empty tote. For example, the conveyor may include a continuous belt, a track, a plurality of motor-driven rollers, or other components configured to support the inventory items and to move the items along an axis of the conveyor toward the tote. In some examples, the conveyor may be a component of a moveable shuttle or other item transport device. In such examples, the shuttle may be moveable along a floor or other such support surface of an order fulfillment facility within which the system is disposed. The shuttle may move along the support surface to transport the items from one location within the order fulfillment facility to another location within the facility.

Example systems may also include a ramp located proximate an end of the conveyor. The ramp may include a declined surface configured to transfer one or more items from the conveyor to the empty tote. Additionally, example systems of the present disclosure may include a platform disposed on and/or otherwise supported by the support surface of the order fulfillment facility. The platform may, in some examples, be a component of a carrier configured to support the tote at a location proximate a bottom end of the ramp. In such examples, the carrier may be disposed on and/or otherwise supported by the support surface, and the platform may be disposed on and/or otherwise supported by the carrier.

In any of the examples described herein, the system may receive a plurality of items from a remote location, such as a location within the order fulfillment facility. For example, such items may be delivered to a sorting station of the system via one or more pods, totes, or other containers. Alternatively, such items may be removed from such containers prior to being received at and/or delivered to the sorting station. In some examples, an operator may dispose the received items on the conveyor described above. Alternatively, an automated item handling assembly associated with the system may dispose the received items on the conveyor.

Once the items have been placed on the conveyor, the conveyor may move the plurality of items in a direction that is along or substantially parallel to a longitudinal axis of the conveyor. For example, a system controller may control one or more rollers of the conveyor to rotate in, for example, a clockwise direction in order to move the items toward the ramp. Additionally, the system may include one or more sensors configured to detect at least one of the items as the items move substantially along the longitudinal axis of the conveyor.

Upon interfacing with the ramp, each item may slide along the declined surface of the ramp, and the declined surface may transfer at least one of the items from the conveyor to the tote disposed on the platform. In any of the examples described herein, the platform may position the tote such that a top surface of a base of the tote extends at an angle, relative to a horizontal plane, greater than approximately 5 degrees and less than approximately 10 degrees. In particular, the platform may position the tote such that the top surface of the base extends at an angle, relative to the horizontal plane, equal to between approximately 6 degrees and approximately 8 degrees. In such examples, the platform may position the tote such that the top surface of the base slopes away from the conveyor from a top end of the top surface to a bottom end of the top surface. As a result, the tote is positioned such that the bottom end of the top surface is disposed closer to the support surface of the order fulfilment facility than the top end of the top surface.

Positioning the various totes of the present disclosure in this way may minimize the risk of items, transferred to the tote from the conveyor, falling out of the tote before the tote is moved away from the conveyor. Further, positioning the totes in this way may assist in maximizing, on average, the number of items that can be disposed within the interior space of the tote before the tote is moved away from the conveyor. Accordingly, the risk of damage to such items may be minimized, and the overall efficiency of the system may be improved.

Figure 1A:
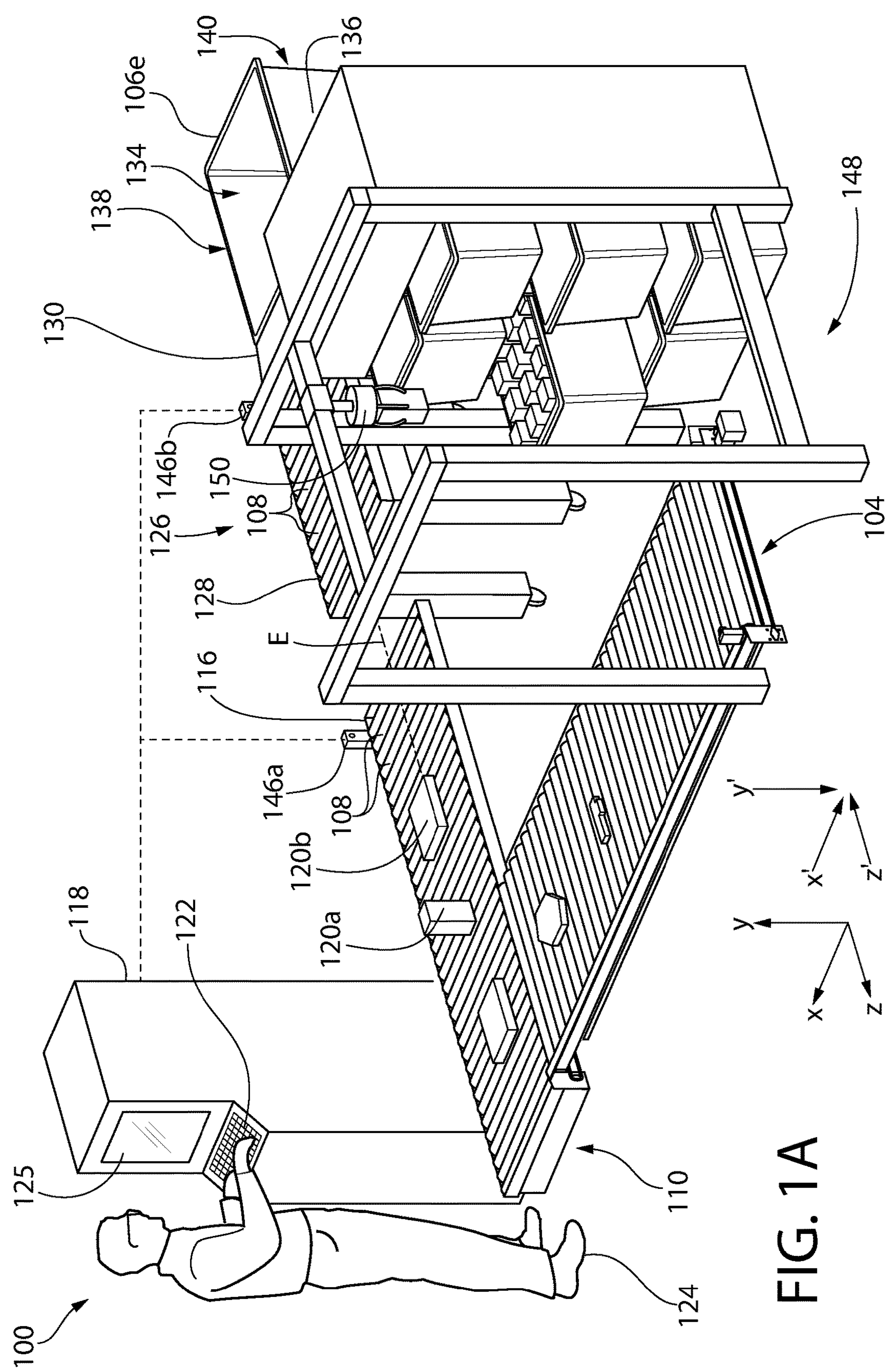
FIG. 1*a* is a perspective view of the system shown in FIG. 1, including an item handling assembly.

Referring now to FIGS. 1 and 1*a*, a detailed example of a system 100 for moving and/or otherwise handling totes, bins, pods, containers, and/or various inventory items in an order fulfilment environment is illustrated. In the examples described herein, the system 100 may include any number or arrangement of components configured to remove inventory items from one or more respective containers, place the removed items onto one or more conveyors, and direct such items onto one or more shuttles configured to transport the items to a destination location. In such examples, an empty tote associated with an order corresponding to the removed items may be disposed at the destination location. Additionally, the shuttles may be moveable along a floor or other support surface of an order fulfillment facility, warehouse, inventory storage facility, or other facility. Such shuttles may travel along the support surface to the destination location, and may be configured to transfer items carried by the shuttle into the empty tote as part of the order fulfilment process. As will be described in greater detail with respect to at least FIGS. 3 and 4, in example embodiments the empty tote may be disposed on a platform at the destination location, and the platform may position the empty tote such that a top surface of a base of the tote extends at an angle, relative to a horizontal plane, greater than approximately 5 degrees and less than approximately 10 degrees. In particular, the platform may position the empty tote such that the top surface of the base extends at an angle, relative to the horizontal plane, equal to between approximately 6 degrees and approximately 8 degrees. In such examples, the platform may position the tote such that the top surface of the base slopes away from the conveyor from a top end of the top surface to a bottom end of the top surface. As a result, the tote may be positioned such that the bottom end of the top surface is disposed closer to the support surface of the order fulfilment facility than the top end of the top surface.

Further, while FIGS. 1 and 1*a* illustrate different example components of the system 100 that may be used to remove inventory items from one or more respective totes, pods, or other containers, it is understood that these examples are not intended to limit the present disclosure in any way. Indeed, in further examples different components and/or arrangements of components may be included in the system 100 to assist in removing inventory items from one or more respective containers, placing the removed items onto one or more conveyors, and/or directing such items onto one or more shuttles of the present disclosure. As shown in FIG. 1, in some examples such inventory items may be manually removed from one or more of the totes, pods, or other containers. As shown in FIG. 1*a*, on the other hand, in other examples one or more sorting machines or other semi or fully-automated item handling assemblies may be used to remove inventory items from the totes, pods, or other containers of the present disclosure. Such item handling assemblies may include one or more pickers or other components configured to remove items from various containers and to place the removed items on a conveyor associated with the system 100.

With reference to the substantially manual item-removal configuration of FIG. 1, an example system 100 may include, among other things, one or more tote handling assemblies 102, 104 configured to support a plurality of totes 106*a*, 106*b*, 106*c*, 106*d*, . . . 106*n* (collectively referred to as "totes 106"). As shown in FIG. 1, the first tote handling assembly 102 may define a longitudinal axis A, and a transverse axis B extending perpendicular to the longitudinal axis A. Similarly, the second tote handling assembly 104 may define a longitudinal axis C and a transverse axis D extending perpendicular to the longitudinal axis C. In examples in which the first tote handling assembly 102 is disposed substantially adjacent to, and/or substantially parallel to the second tote handling assembly 104, the longitudinal axis A of the first tote handling assembly 102 may extend substantially parallel to the longitudinal axis C of the second tote handling assembly 104. Likewise, in such examples, the transverse axis B of the first tote handling assembly 102 may extend substantially parallel to the transverse axis D of the second tote handling assembly 104.

In some examples, first and/or second tote handling assemblies 102, 104 of the present disclosure may include a plurality of rollers 108 or other like components configured to support the totes 106 and/or one or more inventory items as the totes 106 and/or inventory items are moved on or along the tote handling assemblies 102, 104. For example, the rollers 108 may support the totes 106 as the totes 106 are transferred from the first tote handling assembly 102 to the second tote handling assembly 104, from the second tote handling assembly 104 to the first tote handling assembly 102, and so on. In any of the examples described herein, the rollers 108 may comprise a plurality of motor-driven rollers, and each of the rollers 108 may be rotatable in the clockwise and counterclockwise directions. For example, each individual roller 108 may be independently controlled to rotate relative to a frame and/or other component of the respective tote handling assembly 102, 104. It is understood that such rotation in the clockwise or counterclockwise direction may cause corresponding movement of one or more totes 106 and/or inventory items supported by the rollers 108 in a direction X that is along or substantially parallel to the longitudinal axis A of the first tote handling assembly 102 or in a direction X' that is along or substantially parallel to the longitudinal axis A. In such examples, one or more of the rollers 108 may include a respective motor, drive, permanent magnet, wire coil, solenoid, servo, or other component configured to impart a rotational force on the roller 108 and/or otherwise cause the roller 108 to rotate in the clockwise or counterclockwise direction. For example, each motor or other component may be independently operable to rotate a corresponding roller 108 of the first tote handling assembly 102 in the clockwise direction and in the counterclockwise direction. Such motors may comprise, for example, any electric motor known in the art. In such examples, one or more of the motor-driven rollers 108 may comprise an AC or DC-powered roller manufactured by Itoh Denki USA, Inc. of Wilkes-Barre, Pa.

The system 100 may also include one or more sorting stations 110 disposed proximate and/or adjacent to at least part of one or more of the tote handling assemblies 102, 104. For example, the first and second tote handling assemblies 102, 104 may each include a first end 112, and a second end 114 opposite the first end 112. In such examples, the sorting station 110 may include one or more conveyors 116 disposed proximate and/or adjacent to the first end 112 of at least one of the first tote handling assembly 102 or the second tote handling assembly 104. Alternatively, one or more conveyors 116 of the sorting station 110 may be disposed proximate and/or adjacent to the second end 114 of at least one of the first tote handling assembly 102 or the second tote handling assembly 104. The system 100 may also include one or more controllers 118 and, as shown in FIG. 1, in some examples the controller 118 may be disposed at or proximate to the sorting station 110.

In example embodiments in which the system 100 includes more than a single tote handling assembly 102, the system 100 may be configured to facilitate movement of a plurality of totes 106 and/or individual inventory items between the tote handling assemblies 102, 104 in order to direct the individual totes 106 and/or the inventory items to the sorting station 110 in a desired sequence and/or at a desired time. For example, in addition to the rollers 108 described above, the tote handling assemblies 102, 104 may include a plurality of motors, actuators, guides, rails, and/or other components (not shown) configured to assist in transferring one or more totes 106 and/or individual inventory items from the first tote handling assembly 102 to the second tote handling assembly 104, or vice versa such that various respective totes 106 and/or individual inventory items may be directed to the sorting station 110 in a desired sequence and/or at such a specified time.

In example embodiments, the conveyor 116 of the sorting station 110 may be separate from the first and second tote handling assemblies 102, 104, and the conveyor 116 may be substantially similar to and/or the same as at least one of the first and second tote handling assemblies 102, 104. The conveyor 116 may be configured to direct one or more items 120*a*, 120*b* . . . 120*n* (referred to collectively herein as "items 120" or "inventory items 120"), that have been removed from the totes 106 and placed on the conveyor 116, to a shuttle of the system 100. For example, one or more operators positioned at the sorting station 110 may manually remove various items 120 from the totes 106 directed to the sorting station 110 in accordance with one or more orders needing fulfilment. Additionally or alternatively, the sorting station 110 may include one or more item handling assemblies (not shown) configured to remove various items 120 from the totes 106 directed to the sorting station 110. Once the necessary items 120 have been removed from the totes 106, the operator and/or the one or more item handling assemblies may place the removed items (e.g., items 120*a*, 120*b* shown in FIG. 1) onto the conveyor 116 for further processing.

Similar to the tote handling assemblies 102, 104 described above, in some examples the conveyor 116 may include a plurality of rollers 108 and/or other components configured to move the items 120 disposed thereon. For example, rollers 108 of the conveyor 116 may support the individual items 120 disposed thereon, and in any of the examples described herein, the rollers 108 may comprise a plurality of motor-driven rollers. Each individual roller 108 may be independently controlled to rotate relative to a frame and/or other component of the conveyor 116, and each of the rollers 108 may be rotatable in the clockwise and counterclockwise directions. Such rotation in the clockwise or counterclockwise directions may cause corresponding movement of one or more items 120 supported by the rollers 108 in a direction Z that is along or substantially parallel to a longitudinal axis E of the conveyor 116 or in a direction Z' that is along or substantially parallel to the longitudinal axis E. As will be described in greater detail below, in some examples the sorting station 110 may also include one or more scanners, proximity sensors, infrared sensors, RFID readers, and/or other sensors configured to sense the items 120 disposed on the conveyor 116. Further, in some examples, the operator and/or the one or more item handling assemblies of the sorting station 110 may place the removed items (e.g., items 120*a*, 120*b* shown in FIG. 1) onto the conveyor 116 substantially along and/or substantially parallel to the longitudinal axis E such that the items 120 will pass within a field of view of the sensors as the items 120 are moved in the directions Z, Z' on the conveyor 116.

The controller 118 associated with the sorting station 110 may comprise any desktop computer, laptop computers, server computer, tablet computers, cellular phone, personal digital assistant, or other computing device configured to control operation of at least one aspect or component of the system 100. In example systems 100, the controller 118 can include one or more devices in a diverse variety of device categories, classes, or types, and the controller 118 is not limited to a particular type of device. In some examples, the controller 118 may comprise a cluster of computing devices and/or a cloud service.

The controller 118 may include any components configured to assist in controlling operation of the tote handling assemblies 102, 104, the conveyor 116, and/or other components of the system 100, as well as performing any other order fulfilment functions. For example, the controller 118 may include one or more processing unit(s) operably connected to one or more computer-readable media (e.g., memories), such as via a bus. In some instances, such a bus may include one or more of a system bus, a data bus, an address bus, a Peripheral Component Interconnect (PCI) Express (PCIe) bus, a PCI bus, a Mini-PCI bus, and any variety of local, peripheral, or independent buses, or any combination thereof. While the processing units may reside on the controller 118, in other examples such processing units can also reside on different computing devices separate from and in communication with the controller 118.

The computer-readable media described herein with respect to the controller 118 may include computer storage media and/or communication media. Computer storage media includes tangible storage units such as volatile memory, nonvolatile memory, and/or other persistent and/or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, and/or storage media that can be used to store and maintain information for access by the controller 118. In contrast to computer storage media, communication media embodies computer-readable instructions, data structures, program modules, or other data in a modulated data signal, such as a carrier wave, or other transmission mechanism. As defined herein, computer storage media does not include communication media. In some examples, computer-readable media associated with the controller 118 can store instructions executable by the processing unit(s) of the controller 118 to control operation of any of the components of the system 100 and/or to perform any of the other operations described herein. Such computer-readable media can store, for example, computer-executable instructions, an operating system, and/or other computer program instructions.

The one or more processing unit(s) associated with the controller 118 can be or include one or more single-core processors, multi-core processors, CPUs, GPUs, GPGPUs, or hardware logic components configured, e.g., via specialized programming from modules or APIs, to perform functions described herein. For example, and without limitation, illustrative types of hardware logic components that can be used in or as processing units include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and other types of customizable processors. For example, a processing unit 114 can be a hybrid device, such as a device from ALTERA or XILINX that includes a CPU core embedded in an FPGA fabric.

In some examples, the controller 118 can also include one or more user interface(s) 122 configured to permit an operator 124 to operate one or more components of the controller 118, and to thereby control operation of any of the components of the system 100 described herein. In an example embodiment, a user interface 122 can include one or more input devices or output devices integral or peripheral to the controller 118. Examples of input devices associated with the controller 118 can include, e.g., a keyboard, keypad, a mouse, a trackball, a pen sensor or smart pen, a light pen or light gun, a game controller such as a joystick or game pad, a voice input device such as a microphone, voice-recognition device, or speech-recognition device, a touch input device such as a touchscreen, a gestural or motion input device such as a depth camera, a grip sensor, an accelerometer, another haptic input, a visual input device such as one or more cameras or image sensors, and the like.

Examples of output devices associated with the controller 118 can include a display, a printer, audio speakers, beepers, or other audio output devices, a vibration motor, linear vibrator, or other haptic output device, and the like. For example, the sorting station 110 may include a display 125 or other such output device operably connected to the controller 118. In some examples, such a display 125 may be or may include an organic light-emitting-diode (OLED) display, a liquid-crystal display (LCD), a cathode-ray tube (CRT), or another type of visual display. Such a display 125 can be a component of a touchscreen, or can include a touchscreen. In any of the examples described herein, the display 125 may be configured to provide information associated with one or more orders to be fulfilled, the totes 106, and/or with one or more items 106 disposed within and/or removed from the respective totes 106. For example, such information may include, contents of the totes 106 that have been directed to the sorting station 110, the mass of the respective totes 106, the original rack, bin, or other storage location of the respective totes 106, a manufacturer of the items disposed within the respective totes 106, an expiration date or a manufacturing date of such items, and/or any other information associated with filling an order using items disposed within the respective totes 106. The display 125 may also be configured to provide information associated with individual orders corresponding to each respective tote 106 directed to the sorting station 110. Such information may include, for example, a customer name, a shipping address, an order date, a shipping service (e.g., U.S. Postal Service, Federal Express®, United Parcel Service®), and/or an item quantity, and/or other information associated with an order. In example embodiments, the operator 124 may view such information via the display 125, and may transfer one or more items from a tote 106 received at the sorting station 110, to the conveyor 116, to assist in fulfilling corresponding orders. The information may also include one or more instructions, error messages, or other information related to the operation or temporary stoppage of the conveyor 116 and/or other components of the system 100.

As shown in FIG. 1, the system 100 may further include one or more shuttles 126 configured to receive items (shown as example items 120*c*, 120*d*, 120*e* disposed on the shuttle 126) from the conveyor 116, and deliver or otherwise transport the received items 120*c*, 120*d*, 120*e* to a destination location remote from the sorting station 110. In such examples, an empty tote 106*e* associated with an order corresponding to the received items 120*c*, 120*d*, 120*e* may be disposed at the destination location. Additionally, in some examples the shuttles 126 of the present disclosure may moveable along a floor or other support surface of an order fulfillment center, warehouse, inventory storage facility, or other facility. As will be described in greater detail below with respect to FIG. 2, such shuttles 126 may travel along the support surface to the destination location, and may be configured to transfer received items 120 into the empty tote 106*e* as part of the order fulfilment process.

In any of the examples described herein, a shuttle 126 of the system 100 may include a conveyor 128. The conveyor 128 may be substantially similar to and/or the same as the conveyor 116 and/or the one or more tote handling assemblies 102, 104, and may include one or more like components. In some examples, the conveyor 128 may be configured to support a plurality of items 120*c*, 120*d*, 120*e* disposed thereon during movement of the shuttle 126 along the support surface described above, and may be configured to move such items 120*c*, 120*d*, 120*e* along and/or in a direction substantially parallel to a longitudinal axis of the conveyor 128 while the shuttle 126 is stationary on the support surface. In some examples, the longitudinal axis E illustrated in FIG. 1 may also be the longitudinal axis E of the conveyor 128. In such examples, the longitudinal axis E of the conveyor 116 may be collinear with the longitudinal axis E of the conveyor 128. Alternatively, in further examples, a longitudinal axis of the conveyor 128 may be disposed parallel to the longitudinal axis E and/or at any angle relative to the axis E.

As described with respect to the conveyor 116, the conveyor 128 of the shuttle 126 may include a continuous belt, a track, a plurality of rollers 108, and/or other components configured to move the items 120*c*, 120*d*, 120*e* disposed thereon. For example, one or more rollers 108 of the conveyor 128 may support the individual items 120*c*, 120*d*, 120*e*, and in any of the examples described herein, the rollers 108 may comprise a plurality of motor-driven rollers. Each individual roller 108 may be independently controlled to rotate relative to a frame and/or other component of the conveyor 128, and each of the rollers 108 may be rotatable in the clockwise and counterclockwise directions. Such rotation in the clockwise or counterclockwise directions may cause corresponding movement of one or more items 120*c*, 120*d*, 120*e* supported by the rollers 108 in the direction Z along or substantially parallel to the longitudinal axis E of the conveyor 128, or in the direction Z' along or substantially parallel to the longitudinal axis E. In any of the example embodiments described herein, the conveyor 128 (e.g., the rollers 108 of the conveyor 128) may be configured to move the plurality of items 120*c*, 120*d*, 120*e* disposed thereon, in the directions Z, Z', at a velocity equal to between approximately 1 inch/second and approximately 100 inches/second. For example, in some embodiments the conveyor 128 (e.g., the rollers 108 of the conveyor 128) may be configured to move the plurality of items 120*c*, 120*d*, 120*e* disposed thereon, in the directions Z, Z', at a velocity equal to between approximately 60 inch/second and approximately 80 inches/second. It is understood that the velocities noted above are merely examples, and in other embodiments, such velocities may be greater than or less than those noted above. Further, the rollers 108 may be controlled to rotate at substantially constant speeds and/or at variable speeds, as desired.

The system 100 may also include a ramp 130 configured to support at least one item of the plurality of items 120*c*, 120*d*, 120*e* carried by the conveyor 128 as the at least one item is transferred from the conveyor 128 to the empty tote 106*e*. In some examples, the ramp 130 may be connected to the shuttle 126 and/or to the conveyor 128, and may be configured to travel with the shuttle 126 as the shuttle moves along a floor or other support surface. Alternatively, in other examples the ramp 130 may be a separate component of the system 100 that is not connected to the shuttle 126 or the conveyor 128. As will be described in greater detail below with respect to FIG. 2, the ramp 130 may include, for example, a declined top surface configured to support at least one of the items 120*c*, 120*d*, 120*e* transferred from the conveyor 128 to the empty tote 106*e*. The declined surface of the ramp 130 may have, for example, a bottom end disposed adjacent to the tote 106*e* and a top end disposed adjacent to the conveyor 128. In such examples, the declined surface may have any desired length, slope, and/or other configuration such that the items 120*c*, 120*d*, 120*e* transferred from the conveyor 128 may slide along the declined surface and fall into the empty tote 106*e*. For example, the decline surface of the ramp 130 may be a downwardly sloping surface, and the bottom end of the declined surface may be disposed closer to the support surface on which the shuttle 126 is disposed than the top end of the declined surface.

As shown in FIG. 1, the system 100 may also include a carrier 132 that is configured to support the tote 106*e* at a location proximate the ramp 130. For example, the carrier 132 may include one or more components, such as a platform, configured to support the tote 106*e* proximate the ramp 130. In such examples, the tote 106*e* may be disposed on the platform of the carrier 132, and the platform may position the tote 106*e* such that at least part of the tote 106*e* is positioned at a declined angle, similar to the declined surface of the ramp 130. In some examples described herein, the carrier 132 may be movable along the support surface, similar to the shuttle 126. Alternatively, in other example embodiments the carrier 132 may be substantially stationary.

In any of the examples described herein, the carrier 132 may position the tote 106*e* and/or at least a component thereof, such that the items 120*c*, 120*d*, 120*e* transferred from the conveyor 128 may slide along the declined surface of the ramp 130 and fall into an interior space 134 of the tote 106*e*. In such examples, the interior space 134 may be formed, at least in part, by one or more sidewalls of the tote 106*e* and/or by a base of the tote 106. For example, any of the totes 106 described herein may include a front wall 136, and a back wall 138 disposed opposite and/or substantially facing the front wall 136. The totes 106 described herein may also include a right wall 140, and a left wall 142 disposed opposite and/or substantially facing the right wall 140. The walls 136, 138, 140, 142 described herein may comprise sidewalls of the tote 106 and in some examples, the front wall 136 may be disposed substantially parallel to the back wall 138, the right wall 140 may be disposed substantially parallel to the left wall 142, and each of the walls 136, 138, 140, 142 may extend substantially perpendicularly from a base of the tote 106. In such examples, the interior space 134 may be formed, at least in part, by one or more of the walls 136, 138, 140, 142 and/or the base of the tote 106. Further, the totes 106 of the present disclosure may each include a respective longitudinal axis 144.

As shown in FIG. 1, an example longitudinal axis 144 may pass substantially through and/or may extend substantially perpendicular to the right wall 140 and/or the left wall 142. In such examples, the longitudinal axis 144 may extend substantially parallel to the front wall 136 and/or the back wall 138. Additionally, the platform and/or other components of the carrier 132 may position the tote 106*e* such that the longitudinal axis 144 extends substantially parallel to and/or collinear with the longitudinal axis E of the conveyor 128. Further, as will be described in greater detail with respect to at least FIGS. 3 and 4, in example embodiments the platform of the carrier 132 may position the tote 106*e* disposed thereon such that a top surface of a base of the tote 106*e* extends at an angle, relative to a horizontal plane, greater than approximately 5 degrees and less than approximately 10 degrees. In particular, the platform of the carrier 132 may position the tote 106*e* such that the top surface of the base extends at an angle, relative to the horizontal plane, equal to between approximately 6 degrees and approximately 8 degrees. Positioning the tote 106*e* in this way may assist in maximizing, on average, the number of items 120*c*, 120*d*, 120*e* capable of being transferred into the tote 106*e* from the conveyor 128, thereby increasing the efficiency of the system 100.

As shown in FIG. 1, in some examples the system 100 may also include one or more sensors 146*a*, 146*b* (referred to collectively herein as "sensors 146") configured to detect at least one of the items 120*a*, 120*b* disposed on the conveyor 116 and/or one or more items 120*c*, 120*d*, 120*e* disposed on the shuttle 128. In example embodiments, the one or more sensors 146 may be in communication with, and/or operably connected to the controller 118 via one or more networks and/or via one or more wired connections as illustrated by the dashed connection lines shown in FIG. 1. The one or more sensors 146 may comprise, for example, proximity sensors, photo eyes, thermal sensors, mass sensors, infrared sensors, RFID scanners, digital cameras, imaging devices, and/or any combination thereof. Such sensors 146 may be configured to determine a proximity, a location, a mass, a temperature, and/or any other characteristic associated with, for example, one or more of the items 120, one or more of the totes 106, and/or one or more items disposed within the totes 106. In example embodiments, one or more sensors 146 may be disposed on, disposed proximate, and/or connected to the conveyor 116. Additionally or alternatively, one or more sensors 146 may be disposed on, disposed proximate, and/or connected to the shuttle 126, the ramp 130, and/or the carrier 132. Further, network noted above may include one or more personal area networks ("PAN"), local area networks ("LAN"), wide area networks ("WAN"), the internet, and so forth. For example, a communications interface of the controller 118 may include radio modules for a WiFi LAN and a Bluetooth PAN. Such communication interfaces may be in communication with and/or operably connected to similar communication interfaces of the one or more sensors 146.

In example embodiments, at least one of the sensors 146 may be configured to determine the presence of, a positon, a velocity, an acceleration, an alignment, an orientation, and/or other characteristic of one or more of the items 120 disposed on at least one of the conveyors 116, 128. In example embodiments, the orientation and/or alignment described herein may comprise an angular orientation and/or an orientation expressed or otherwise determined in Cartesian coordinates. Such an orientation and/or alignment may be determined relative to, for example, the longitudinal axis E of the conveyor 116 and/or of the conveyor 128. In such examples, the display 125 may be configured to display and/or otherwise provide information indicative of and/or otherwise associated with the orientation of each respective item 120.

In some examples, at least one of the sensors **146*a* may be configured to scan an RFID tag, a bar code, and/or other information feature disposed on the items 120*a*, 120*b* carried by the conveyor 116 as the items 120*a*, 120*b* pass within a field of view of the sensor 146 due to operation of the rollers 108. Additionally or alternatively, at least one of the sensors 146*a* may be configured to scan an RFID tag, a bar code, and/or other information feature disposed on one or more totes 106 carried by the conveyor 116. The sensor 146*a* may generate one or more signals including information obtained from the information feature, and the sensor 146*a* may direct such signals to the controller 118. In some examples, the controller 118 may compare the obtained information with one or more inventory databases and/or order fulfillment protocols stored in a memory of the controller 118. The controller 118** may also update such inventory databases and/or order fulfillment protocols based on and/or at least partly in response to receiving the obtained information.

In additional examples, at least one of the sensors **146*b* may be configured to determine, for example, whether an item 120*c*, 120*d*, 120*e* has been placed within in one or more of the totes 106*e*, an identity of one or more items 120*c*, 120*d*, 120*e* disposed on the conveyor 128 and/or within one or more of the particular totes 106*e*, an orientation, position, and/or alignment of such an item 120*c*, 120*d*, 120*e* within one or more of the totes 106*e*, and/or any other visually, thermally, or otherwise distinguishable characteristic of such items 120*c*, 120*d*, 120*e*. In such examples, at least one of the sensors 146*b* and/or the controller 118 may employ image recognition software, neural networks, and/or other components to assist in making such determinations. For example, in such embodiments at least one of the sensors 146*b* may scan a tote 106*e* disposed on a platform of the carrier 132 before the items 120*c*, 120*d*, 120*e* have been placed in the tote 106*e*, and may generate one or more images and/or signals including information indicative of the tote 106*e* without the items 120*c*, 120*d*, 120*e*. As the various items 120*c*, 120*d*, 120*e* are transitioned from the conveyor 128 to the tote 106*e*, at least one of the sensors 146*b* may scan the tote 106*e* one or more additional times to determine the presence of the items 120*c*, 120*d*, 120*e* within the tote 106*e*, the identity of the items 120*c*, 120*d*, 120*e*, the orientation of the items 120*c*, 120*d*, 120*e* within the tote 106*e*, whether any of the items 120*c*, 120*d*, 120*e* have fallen out of the tote 106*e*, and/or whether one or more of the items 120*c*, 120*d*, 120*e* may be positioned so as to block additional items from being transferred from the conveyor 128 to the tote 106*e* via the ramp 130. In such examples, at least one of the sensors 146*b* may generate one or more additional signals including information indicative of the conditions noted above. The at least one of the sensors 146*b* may direct such signals to the controller 118 and, in such examples, the controller 118 may identify the items 120*c*, 120*d*, 120*e* using image recognition software stored in a memory of the controller 118. In some examples, such as situations in which the controller 118 determines, based on or at least partly in response to the signals received from the at least one of the sensors 146*b*, that one of the items 120*c*, 120*d*, 120*e* has fallen out of the tote 106*e* or that one or more of the items 120*c*, 120*d*, 120*e* is positioned so as to block additional items 120 from being transferred into the tote 106*e*, the controller 118 may control the conveyor 128 to temporarily halt operation in response to such a determination. Stopping operation in this way may enable the operator 124 to adjust the items 120*c*, 120*d*, 120*e* within the tote 106*e*** and/or otherwise address the conditions noted above such that normal system operation can resume.

FIG. **1*a* illustrates another example embodiment of the present disclosure in which the system 100 includes one or more sorting machines or other semi or fully-automated item handling assemblies 148 configured to remove inventory items 120 from various pods, totes, and/or other containers of the present disclosure. Such item handling assemblies 148 may include one or more pickers 150 or other components configured to remove items 120 from various totes 106 and to place the removed items 120 onto one or more of the conveyors 104, 116, 128 associated with the system 100. In such examples, a plurality of totes 106 holding respective inventory items 120 may be disposed on a tote storage rack or other such device, and in such examples, the picker 150 of the item handling assembly 148 may be configured to remove one or more items 120 from one or more of the totes 106 while the totes 106 are disposed substantially within and/or supported on the storage rack. The picker 150 may be connected to one or more arms, rods, beams, supports and/or other components configured to assist in moving the picker 150 relative to the totes 106 such that the picker 150 may remove items 120 from the respective totes 106 and dispose the removed items 120 onto the one or more conveyors 104, 116, 128 of the system 100. In some examples, the item handling assembly 148, picker 150, storage rack, and/or other components associated with the system 100 illustrated in FIG. 1*a*** may be manufactured by OPEX® Corporation of Moorestown, N.J.

In some examples, the totes 106 may remain substantially stationary relative to the picker 150 while disposed on the storage rack. Alternatively, in other examples, the storage rack may be configured to move the totes 106 vertically, horizontally, and/or in any other direction relative to the picker 150 in order to assist the picker 152 in removing items 120 from the respective totes 106. Further, it is understood that the item handling assemblies 148, pickers 150, and/or storage racks described herein may be operably connected to the controller 118 to facilitate such relative movement and/or any of the other operations described herein. As shown in FIG. **1*a*, the system 100 may also include any of the shuttles 126, ramps 130, carriers 132, and/or other components described above with respect to the system 100 shown in FIG. 1. Additionally, in any of the examples described herein, one or more of the conveyors 104, 116 may be omitted. In such examples, the item handling assemblies 148 and/or the picker 150 shown in FIG. 1*a* may be configured to dispose items 120 removed from the various totes 106 directly onto one or more shuttles 126 and/or conveyors 128 thereof. Alternatively, in the embodiment illustrated in FIG. 1, the operator 124 may dispose items 120 removed from the various totes 106 directly onto one or more shuttles 126 and/or conveyors 128** thereof.

Figure 2:
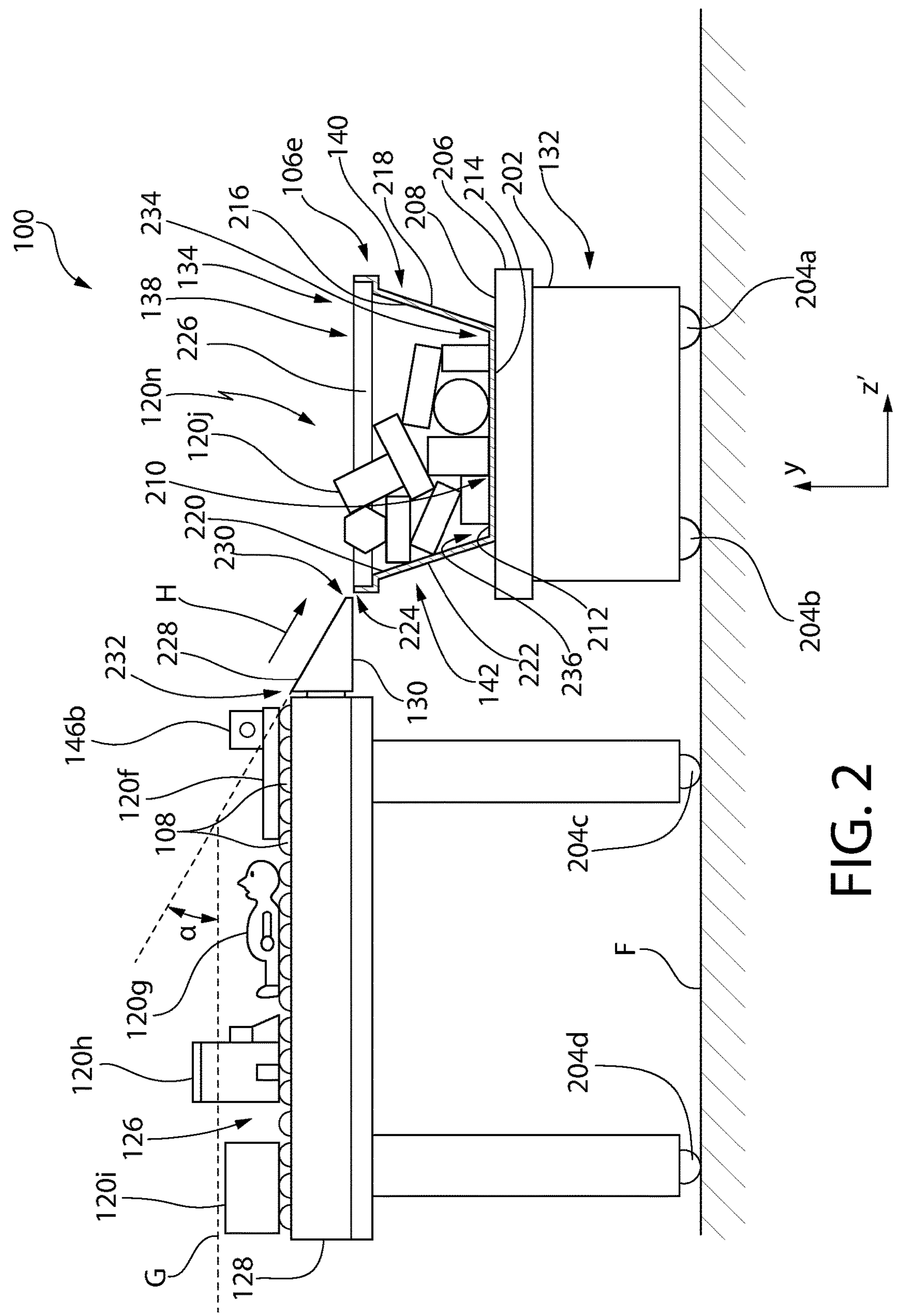
FIG. 2 is a side elevation view of a portion of the system shown in FIG. 1, including a tote disposed in a substantially horizontal position.

FIG. 2 illustrates an example shuttle 126, ramp 130, and carrier 132 of the system 100 in more detail. As shown in FIG. 2, in some examples the carrier 132 may include a base 202 that is disposed on and/or otherwise supported by a support surface F of the order fulfillment center, warehouse, inventory storage facility, or other facility in which the system 100 is being used. In such examples, the base 202 may be supported on the support surface F by one or more legs, mounts, and/or other components of the carrier 132. In such embodiments, the carrier 132 may remain substantially stationary during operation of the system 100. Additionally, in such examples the carrier 132 may be at least temporarily and/or permanently fixed to the support surface F such that the carrier 132 remains substantially stationary relative to the support surface F. Alternatively, in some examples the carrier 132 may include one or more wheels, tracks, rollers, and/or other components 204*a*, 204*b* (referred to collectively herein as "components 204") configured to assist in moving the carrier 132 along the support surface F. For example, in some embodiments the components 204 may comprise motorized wheels configured to move the carrier 132 between various locations of the facility in which the system 100 is being used. In such examples, the carrier 132 and/or the components 204 may be operably connected to the controller 118 (FIG. 1), and the controller 118 may be configured to control movement of the carrier 132 during operation of the system 100.

As shown in FIG. 2, in some examples the shuttle 126 may also include one or more wheels, tracks, rollers, and/or other components 204*c*, 204*d* (referred to collectively herein as "components 204") configured to assist in moving the shuttle 126 along the support surface F. For example, in some embodiments, the components 204 of the shuttle 126 may comprise motorized wheels configured to move the shuttle 126 between various locations of the facility in which the system 100 is being used. For example, the components 204 of the shuttle 126 may be configured to move the shuttle 126 from a first location proximate the conveyor 116 of the sorting station 110 (FIG. 1) to a second location different from the first location and proximate the carrier 132. Once positioned, for example, adjacent to the tote 106*e* supported by the carrier 132 at such a second location, the conveyor 128 of the shuttle 126 may move a plurality of items 120*f*, 120*g*, 120*h*, 120*i* disposed on the conveyor 128 in the direction Z' and/or substantially along the longitudinal axis E of the conveyor 128 to transfer the items 120*f*, 120*g*, 120*h*, 120*i* into the tote 106*e*. In such examples, the shuttle 126 and/or the components 204 of the shuttle 126 may be operably connected to the controller 118 (FIG. 1), and the controller 118 may be configured to control movement of the shuttle 126 during operation of the system 100.

The carrier 132 may also include a platform 206 disposed on and/or otherwise supported by the support surface F, and the platform 206 may be configured to support the tote 106*e*. In such examples, the platform 206 may be disposed on and/or connected to the base 202, and the platform 206 may be supported on the support surface F by the base 202. The platform 206 may have any length, width, height, thickness, and/or other configuration configured to assist in supporting the tote 106*e* at a location proximate the shuttle 126 and/or proximate the ramp 130. For example, the platform 206 may include a top surface 208 that is substantially planar in order to support the tote 106*e* thereon. In example embodiments, the top surface 208 of the platform, 206 may be disposed at any angle relative to, for example, the support surface F and/or a horizontal plane G. For example, as illustrated in FIG. 2, in some embodiments the top surface 208 may extend substantially parallel to the support surface F and/or the horizontal plane G. Additionally, in some examples, the top surface 208 may include one or more grips, pads, brackets, and/or other components configured to assist in holding the tote 106*e* at a substantially stationary position, and/or location on the top surface 208 while a plurality of items 120*n* are transferred into the interior space 134 of the tote 106 by the conveyor 128.

In example embodiments, any of the totes 106 described herein may include a substantially planar base 210. As described above, the various walls 136, 138, 140, 142 of each respective tote 106 may extend substantially perpendicularly from the base 210 of the tote 106. In such examples, the interior space 134 may be formed, at least in part, by one or more of the walls 136, 138, 140, 142 and/or the base 210 of the tote 106. As shown in FIG. 2, in some examples the base 210 may include a substantially planar top surface 212 defining at least part of the interior space 134. The base 210 may also include a substantially planar bottom surface 214 opposite and/or substantially parallel to the top surface 212. In example embodiments of the present disclosure, the bottom surface 214 of the base 210 may be disposed on and/or may otherwise be in contact with the top surface 208 of platform 206, and the platform 206 may position the tote 106*e* such that a first end of the top surface 212 may be disposed closer to the ramp 130 and/or the conveyor 128 than a second end of the top surface 212 opposite the first end. Further, the platform 206 may position the tote 106*e* such that the top surface 212 of the base 210 extends in any desired angle relative to the horizontal plane G. In the example embodiment illustrated in FIG. 2, the platform 206 positions the tote 106*e* such that the top surface 212 of the base 210 extends substantially parallel to the horizontal plane G. In additional examples, however, the platform 206 may position the tote 106*e* such that the top surface. 212 extends at an angle, relative to the horizontal range, greater than approximately 5 degrees and less than approximately 10 degrees. In such examples, the top surface 212 of the base 210 may comprise a declined surface of the tote 106*e*, and the top surface 212 may slope away from, for example, the conveyor 128. Additionally, in any of the examples described herein, the platform 206 may position the tote 106*e* such that the longitudinal axis 144 of the tote 106*e* (FIG. 1) extends substantially perpendicular to the longitudinal axis E (FIG. 1) of the conveyor 128.

With continued reference to FIG. 2, it is understood that the walls 136, 138, 140, 142 the tote 106*e* may each include respective inner and outer surfaces, and that the inner surfaces of the walls 136, 138, 140, 142 may each form respective parts of the interior space 134 of the tote 106. Additionally, the respective inner surfaces of the walls 136, 138, 140, 142 may assist in retaining the plurality of items 120*n* transferred into the interior space 134 by the conveyor 128. For example, as shown in FIG. 2 the right wall 140 may include an inner surface 216 facing the interior space 134, and an outer surface 218 opposite the inner surface 216. Similarly, the left wall 142 may include an inner surface 220 facing the interior space 134, and an outer surface 222 opposite the inner surface 220. Further, the respective inner and outer surfaces of the walls 136, 138, 140, 142 may each include a bottom end disposed adjacent to the base 210 of the tote 106*e*, as well as a top end disposed opposite the corresponding bottom end. For example, as shown in FIG.

2, the outer surface 222 of the left wall 142 may include a top end 224 disposed opposite the base 210, and the platform 206 may position the tote 106e such that the top end 224 of the outer surface 222 is disposed proximate and/or substantially adjacent to at least part of the ramp 130. As can be seen in FIG. 2, the back wall 138 may also include an inner surface 226 having a bottom end adjacent the base 210, and a top end disposed opposite the bottom end.

It is understood that the respective inner and outer surfaces of the walls 136, 138, 140, 142 may extend at any angle relative to, for example, the top surface 212 of the base 210 in order to facilitate retaining the plurality of items 120n within the interior space 134. For example, as most clearly seen in FIG. 3, the inner surface 220 of the left wall 142 may extend at an included angle $\phi$ relative to the top surface 212 of the base 210, and the angle $\phi$ may have any value equal to between approximately 90 degree and approximately 180 degrees. For example, in some embodiments the angle $\phi$ may have a value equal to between approximately 90 degree and approximately 135 degrees. In further embodiments, the angle $\phi$ may have any value equal to between approximately 90 degree and approximately 105 degrees. It is understood that the positons, angles, and/or other configurations described herein with respect to the walls 136, 138, 140, 142, and/or surfaces thereof, are merely examples, and that in further embodiments, the positons, angles, and/or other configurations described herein with respect to the walls 136, 138, 140, 142, and/or surfaces thereof, may have values greater than or less than those described above.

As noted above, the ramp 130 may be configured to assist in transferring a plurality of items 120 from the conveyor 128 into the tote 106e disposed on the platform 206. The ramp 130 may include any surfaces, guides, rails, grooves, channels, and/or other structures are components configured to assist in transferring such items 120. For example, such components may guide the items 120 to move, in the direction of arrow H, along a top declined surface 228 of the ramp 130, and into the interior space 134 of the tote 106e. The declined surface 228 of the ramp 130 may comprise a substantially planar, substantially smooth surface configured to minimize and/or substantially eliminate frictional forces and/or other resistance forces between the ramp 130 and the items 120 as the items 120 are transferred from the conveyor 128 to the tote 106e.

In example embodiments, the declined surface 228 may have any length, width, height, angular orientation, and/or other configuration configured to assist in supporting each of the items 120 as the items slidably and/or otherwise move along the declined surface 228. For example, as shown in FIG. 2, the declined surface 228 may include a bottom end 230, and a top end 232 opposite the bottom end 230. In such examples, the bottom end 230 may be disposed proximate and/or adjacent to the tote 106e, and the top end 232 may be disposed proximate and/or adjacent to the conveyor 128. In particular, the bottom end 230 of the declined surface 228 may be disposed proximate and/or adjacent to the top end 224 of the outer surface 222. The tote 106e may be position relative to the ramp 130 so as to minimize and/or substantially eliminate the gap and/or other distance between, for example, the bottom end 230 of the declined surface 228 and the top end 224 of the outer surface 222. For example, the tote 106e may be positioned such that the top end 224 is disposed just beneath the bottom end 230 of the declined surface 228. Additionally, the ramp 130 may be oriented such that the bottom end 230 of the declined surface 228 is disposed closer to the support surface F than the top end 232 of the declined surface 228. For example, the bottom end 230 may be spaced from the support surface F by a first substantially vertical distance, and the top end 232 may be spaced from the support surface F by a second substantially vertical distance greater than the first substantially vertical distance. Thus, as shown in FIG. 2, the declined surface 228 may slope downward and/or away from the conveyor 128, and toward the support surface F, from the top end 232 to the bottom end 230.

It is understood that the declined surface 228 may extend at any angle relative to the horizontal plane G in order to facilitate transferring a plurality of items 120 from the conveyor 128 to the tote 106e. For example, the declined surface 228 may extend at an angle $\alpha$ relative to the horizontal plane G, and the angle $\alpha$ may have any value equal to between approximately 1 degree and approximately 90 degrees. For example, in some embodiments the angle $\alpha$ may have a value equal to between approximately 5 degree and approximately 45 degrees. In further embodiments, the angle $\alpha$ may have any value equal to between approximately 10 degree and approximately 20 degrees. Further, the declined surface 228 may have any length, as measured from the top end 232 to the bottom end 230 in the direction of arrow H, to assist in supporting each of the items 120 as the items 120 slide and/or otherwise move along the declined surface 228. For example, in some embodiments the length of the declined surface 228 may be equal to between approximately 1 inch and approximately 36 inches. In further embodiments, the length of the declined surface 228 may have any value equal to between approximately 1 inch and approximately 12 inches. It is understood that the lengths, angles, and/or other configurations described herein with respect to the declined surface 228 are merely examples, and that in further embodiments, the lengths, angles, and/or other configurations of the declined surface 228 may have values greater than or less than those described above.

In the example embodiment illustrated in FIG. 2, the platform 206 positions the tote 106e such that the top surface 212 of the base 210 extends substantially parallel to the horizontal plane G. In such embodiments, the items 120n transferred into the tote 106e from the conveyor 128 may tend to collect proximate the inner surface 220 of the left wall 142, thereby resulting in a relatively uneven distribution of the items 120n within the interior space 134. In such examples, one or more items 120j may be positioned proximate and/or adjacent to the bottom end 230 of the declined surface 228 during operation of the system 100, and in some examples, such items 120j may block and/or otherwise hinder further items 120 from being transferred into the tote 106e from the conveyor 128. Additionally, as a result of the relatively uneven distribution of items 120n within the interior space 134 illustrated in FIG. 2, the tote 106e may be "underfilled" (e.g., may not be loaded with an approximate maximum number of items 120) before being moved away from the conveyor 128 by either the carrier 132 or an operator 124. In example embodiments, a tote 106e of the present disclosure may be characterized as being "underfilled" in situations in which approximately 21 items 120n or fewer are disposed within the interior space 134 before being moved away from the conveyor 128 by either the carrier 132 or an operator 124. Additionally or alternatively, in any of the examples described herein a tote 106e of the present disclosure may be characterized as being "underfilled" in situations in which less than approximately 40 percent of the total volume of the interior space 134 is taken up by the items 120n disposed in the tote 106e before the tote 106e is moved away from the conveyor 128 by either the carrier 132 or an operator 124. In example embodiments, it may be common for a tote 106*e* of the present disclosure to be underfilled by the system 100 in situations in which the platform 206 positions the tote 106*e* such that the top surface 212 of the base 210 extends at an angle, relative to the horizontal plane G, between approximately 0 degrees and approximately 5 degrees. In such embodiments, such as the embodiment illustrated in FIG. 2, approximately 17 items 120 or fewer may be disposed within the interior space 134 before the tote 106*e* is moved away from the conveyor 128 by either the carrier 132 or an operator 124. It is understood that the criteria described above with respect to underfilling the totes 106 may be applicable to randomly shaped and/or sized items 120 having, on average, a length less than approximately 15 inches, a width less than approximately 12 inches, and a height less than approximately 4 inches.

Figure 3:
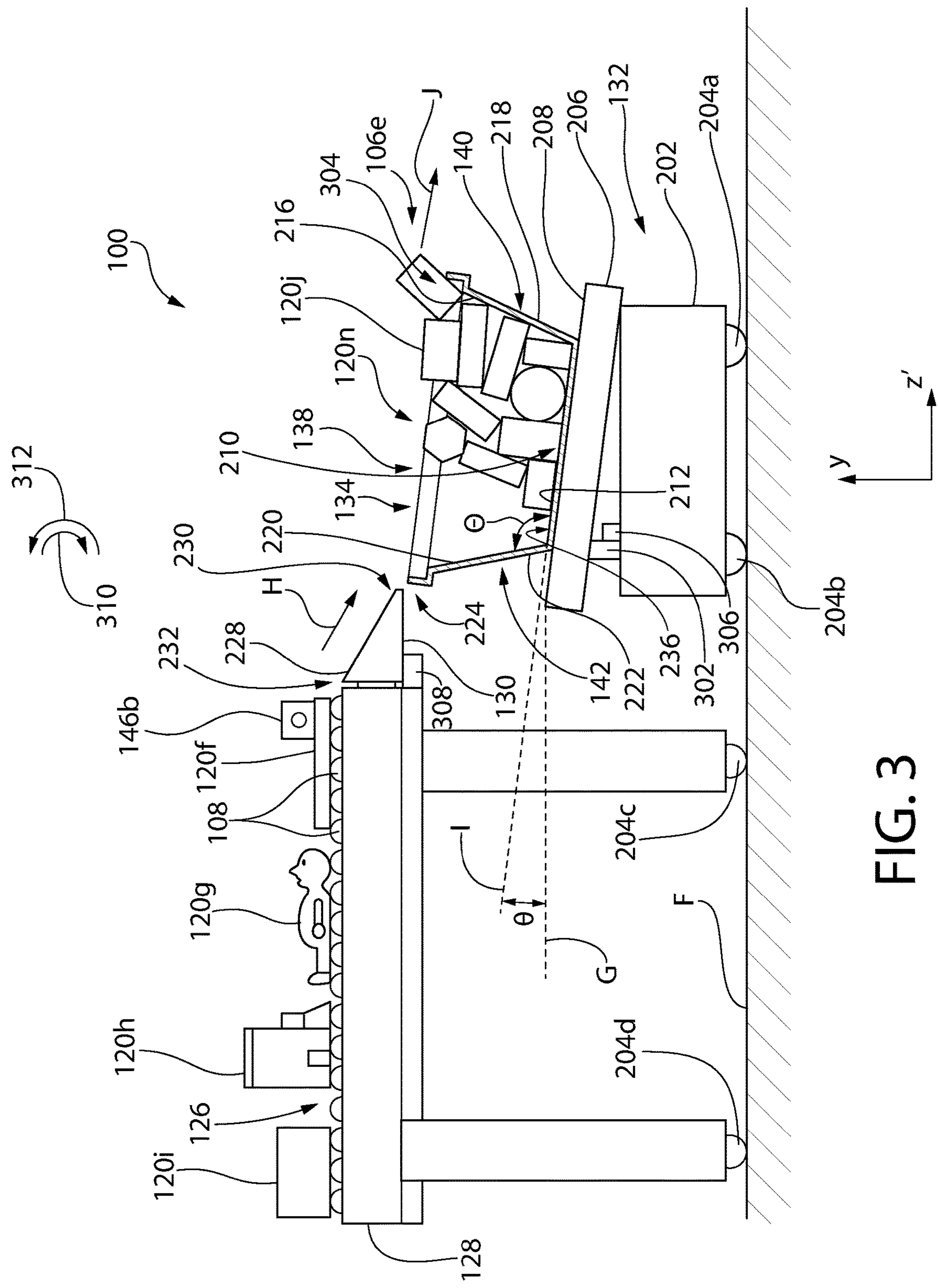
FIG. 3 is a side elevation view of a portion of the system shown in FIG. 1, including a tote disposed in an inclined position.

It is also understood that angling the totes 106 of the present disclosure at an extreme angle relative to the horizontal plane G may have additional undesired consequences. For example, in some embodiments the platform 206 may be configured to position the tote 106*e* such that the top surface 212 extends at an angle, relative to the horizontal plane G, greater than approximately 10 degrees. In such examples, the top surface 212 of the base 210 may comprise a declined surface of the tote 106*e*, and the top surface 212 may slope away from, for example, the conveyor 128. In particular, in any of the examples described herein, the top surface 212 may include a first end 234 and a second end 236 disposed opposite the first end 234. As shown in FIG. 3, in some examples the platform 206 may position the tote 106*e* such that the top surface 212 of the base 210 slopes away from the conveyor 128 from the second end 236 (e.g., a top end 236 of the top surface 212) to the first end 234 (e.g., a bottom end 234 of the top surface 212). In such examples, the first end 234 (e.g., the bottom end 234) may be disposed closer to the support surface F than the second end 236 (e.g., the top end 236). For example, the first or bottom end 234 may be spaced from the support surface F by a third substantially vertical distance, and the second or top end 236 may be spaced from the support surface F by a fourth substantially vertical distance greater than the third substantially vertical distance. As shown by the dashed line I illustrated in FIG. 3, in such examples the top surface 212 of the base 210 may extend at an angle θ, relative to the horizontal plane G, greater than approximately 10 degrees. Further, in the example embodiment of FIG. 3 the top surface 208 of the platform 206 may be in contact with the bottom surface 214 of the base 210, and the top surface 208 of the platform 206 may also extend at the angle θ, relative to the horizontal plane G. In some examples, the carrier 132 may include one or more stands 302 or other like components to assist in angling the platform 206 relative to, for example, the base 202 and/or the support surface F. Alternatively, in further examples, the base 202 may be configured to angle the platform 206 relative to the support surface F and such stands 302 may be omitted.

In some situations, however, positioning the tote 106*e* as illustrated in FIG. 3 may result in one or more items 120*j* being disposed at a location within the interior space 134 at which such items 120*j* are at risk of falling out of the tote 106*e*, or may result in one or more items 120 actually falling out of the tote 106*e* and onto the support surface F. For example, in the embodiment of FIG. 3 the items 120*n* transferred into the tote 106*e* from the conveyor 128 may tend to collect proximate the inner surface 216 of the right wall 140. In particular, such items 120*n* may collect proximate a top end 304 of the inner surface 216, thereby resulting in a relatively uneven distribution of the items 120*n* within the interior space 134. In such examples, one or more items 120*j* positioned proximate and/or adjacent to the top end 304 of the inner surface 216 may be at risk of falling out of the tote 106*e* in the direction of arrow J, and/or may actually fall out of the tote 106*e* in the direction of arrow J and onto the support surface F. Such items 120*j* may be at risk of being damaged and/or may actually be damaged due to impact between the items 120*j* and the support surface F. Additionally, as a result of the relatively uneven distribution of items 120*n* within the interior space 134 illustrated in FIG. 3, the tote 106*e* may be underfilled before being moved away from the conveyor 128 by either the carrier 132 or an operator 124. For example, in the embodiment illustrated in FIG. 3, approximately 21 items 120 or fewer may be disposed within the interior space 134 before the tote 106*e* is moved away from the conveyor 128 by either the carrier 132 or an operator 124.

In some examples, the system 100 may include one or more additional components configured to assist in increasing, on average, the number of items 120 capable of being transferred into the tote 106*e* from the conveyor 128. For example, the carrier 132 may be equipped with one or more actuators 306 configured to modify the position of the platform 206 (and, thus, the position of the tote 106*e*) relative to the ramp 130. For example, such actuators 306 may be connected to the platform 206, the stand 302, and/or the base 202, and may include one or more stepper motors, solenoids, vibration devices, pneumatic actuators, and/or any other mechanical, electro-mechanical, pneumatic, or other devices capable of controllably moving, rotating, and/or vibrating the platform 206. In some examples, such actuators 306 may be operably connected to the controller 118 (FIG. 1). For example, the actuator 306 may be configured to move at least part of the platform 206 vertically, such as in the direction Y and/or in a direction opposite the direction Y. Moving at least part of the platform 206 in this way may cause the platform 206 to pivot, rotate, and/or otherwise move relative to, for example, the ramp 130 and/or the support surface F. For example, moving a left side of the platform 206 vertically in the direction Y may cause the platform 206 to be positioned as shown in FIG. 3. Additionally, moving the platform 206 in this way may modify (e.g., increase or decrease) the angle θ, relative to the horizontal plane G. In such examples, the platform 206 may be hingedly, pivotally, rotatably, and/or otherwise moveably connected to the base 202 of the carrier 132. Further, in examples in which the actuator 306 is configured to vibrate the platform 206, such vibration may cause the items 120 disposed within the tote 106*e* being supported by the platform 206 to settle within the tote 106*e* and/or may otherwise cause such items to be substantially evenly distributed within the tote 106*e*. In such examples, vibrating the tote 106*e* in this way may assist in increasing the number of items 120 capable of being transferred into the tote 106*e* from the conveyor 128.

In some examples, the system 100 may also include one or more actuators 308 configured to modify the position of the ramp 130 relative to the conveyor 128 and/or relative to the tote 106*e*. For example, such actuators 308 may be connected to the ramp 130 and/or the shuttle 126, and may include one or more stepper motors, solenoids, vibration devices, pneumatic actuators, and/or any other mechanical, electro-mechanical, pneumatic, or other devices capable of controllably moving, rotating, and/or vibrating the ramp 130. In some examples, such actuators 308 may be similar to and/or substantially identical to the actuators 306 described above with respect to the platform 206, and such actuators 308 may be operably connected to the controller 118 (FIG. 1). For example, the actuator 308 may be configured to move at least part of the ramp 130 vertically, such as in the direction Y and/or in a direction opposite the direction Y. The actuator 308 may also be configured to move the ramp 130 horizontally, such as in the direction Z' and/or in a direction opposite the direction Z'. In still further examples, the actuator 308 may be configured to rotate the ramp 130 clockwise in the direction of arrow 310 and/or counterclockwise in the direction of arrow 312. Moving the ramp 130 in this way may assist in positioning the ramp 130 at, for example, a desirable angle and/or at desirable location relative to the tote 106*e*. In any of the examples described herein, the actuators 306, 308 may be controlled by the controller 118 to modify the position of the platform 206 and the ramp 130, respectively, in real-time. Further, during operation of the system 100, the controller 118 may control the shuttle 126 to move along the support surface F relative to the carrier 132 in order to modify and/or optimize the position of the conveyor 128 and/or the ramp 130 relative to the tote 106*e*.

Figure 4:
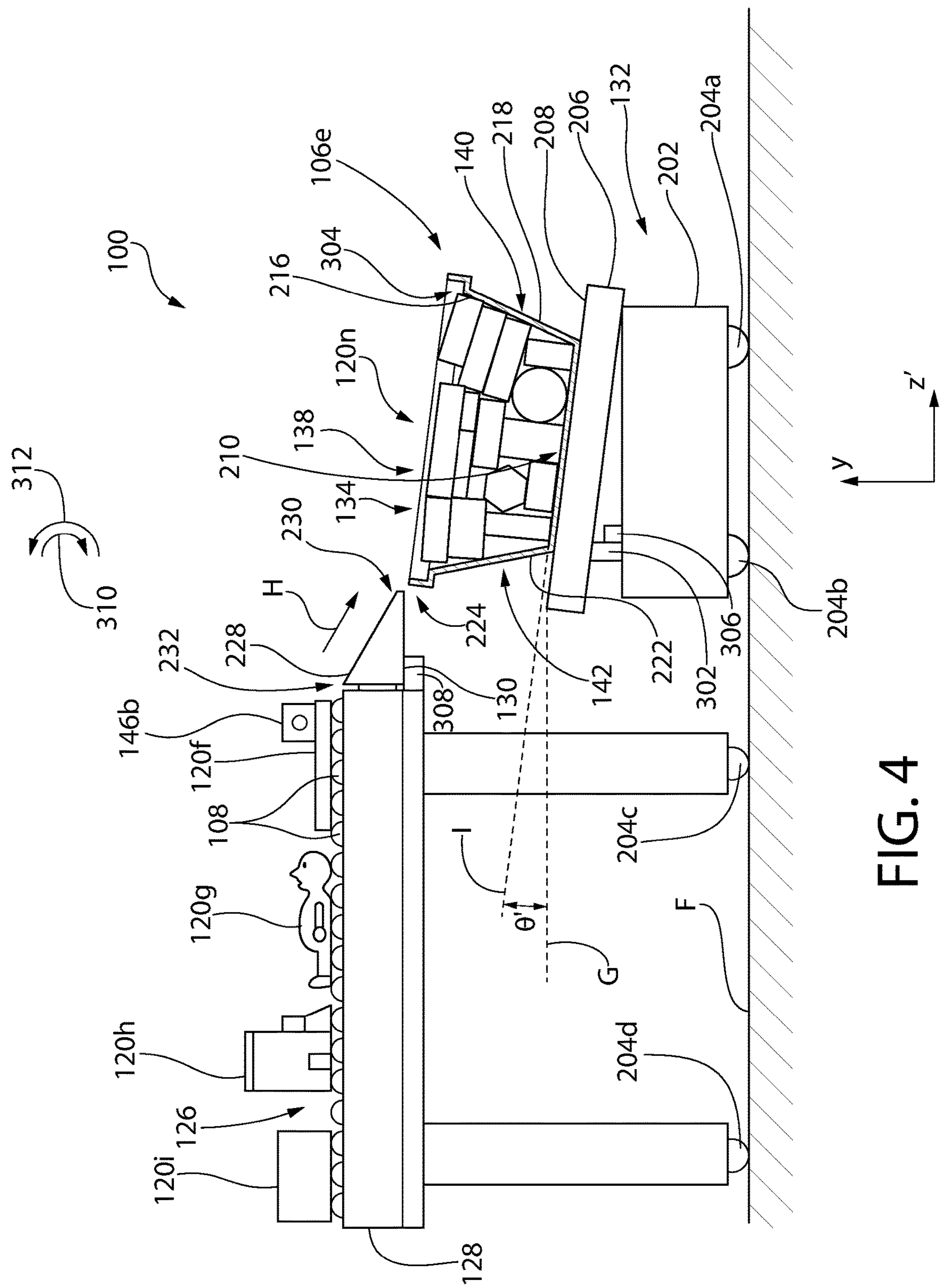
FIG. 4 is another side elevation view of a portion of the system shown in FIG. 1, including a tote disposed in an inclined position.

Accordingly, in example embodiments of the present disclosure the system 100 may be configured to avoid underfilling the totes 106, and to avoid situations in which items 120 fall out of the interior space 134 in the direction of arrow J. FIG. 4 illustrates such an example embodiment. As shown in FIG. 4, in some embodiments the platform 206 may be configured to position the tote 106*e* such that the top surface 212 of the base 210 extends at an angle, relative to the horizontal plane G, greater than approximately 5 degrees and less than approximately 10 degrees. In particular, as illustrated by the dashed line I shown in FIG. 4, in such embodiments the top surface 212 of the base 210 may extend at an angle θ', relative to the horizontal plane G, greater than approximately 5 degrees and less than approximately 10 degrees. In further examples, the top surface 212 of the base 210 may extend at an angle θ', relative to the horizontal plane G, equal to between approximately 6 degrees and approximately 8 degrees. Further, in the example embodiment of FIG. 4 the top surface 208 of the platform 206 may be in contact with the bottom surface 214 of the base 210, and the top surface 208 of the platform 206 may also extend at the angle θ', relative to the horizontal plane G.

In the embodiment illustrated in FIG. 4, the top surface 212 of the base 210 may comprise a declined surface of the tote 106*e*, and the top surface 212 may slope away from, for example, the conveyor 128. In particular, in the embodiment of FIG. 4, the platform 206 may position the tote 106*e* such that the top surface 212 of the base 210 slopes away from the conveyor 128 from the second end 236 (e.g., a top end 236 of the top surface 212) to the first end 234 (e.g., a bottom end 234 of the top surface 212). In such examples, the first end 234 (e.g., the bottom end 234) may be disposed closer to the support surface F than the second end 236 (e.g., the top end 236). For example, as noted above with respect to FIG. 3, the first or bottom end 234 may be spaced from the support surface F by a third substantially vertical distance, and the second or top end 236 may be spaced from the support surface F by a fourth substantially vertical distance greater than the third substantially vertical distance.

With the tote 106*e* positioned as shown in FIG. 4, the items 120*n* transferred from the conveyor 128 and into the tote 106*e* may be at minimal risk of falling out of the tote 106*e* before the tote 106*e* is moved away from the conveyor 128. Further, with the tote 106*e* positioned as shown in FIG. 4, the items 120*n* may be substantially evenly distributed within the interior space 134 as the items 120*n* are transferred from the conveyor 128 to the tote 106*e*. As a result, positioning the tote 106*e* in this manner may assist in maximizing, on average, the number of items 120*n* disposed within the interior space 134 before the tote 106*e* is moved away from the conveyor 128. For example, in the embodiment illustrated in FIG. 4, approximately 27 items 120 or more may be disposed within the interior space 134 before the tote 106*e* is moved away from the conveyor 128 by either the carrier 132 or an operator 124.

As noted above, example systems 100 of the present disclosure may include, at least one of a controller 118, a conveyor 128 having a longitudinal axis E and being disposed on a support surface F, a ramp 130 configured to transfer one or more items 120 from the conveyor 128 to a tote 106*e*, and a platform 206 disposed on and/or otherwise supported by the support surface F. In any of the example embodiments described herein, the system 100 may receive a plurality of items 120 from a remote location, such as a location within the order fulfillment facility within which the system 100 is disposed. For example, such items 120 may be delivered to a sorting station 110 of the system 100 via one or more totes 106 or, alternatively, such items 120 may be removed from the respective totes 106 prior to being received at, for example, the sorting station 110 of the system 100. In some examples, an operator 124 may dispose the received items 120 on the conveyor 128 and/or on a separate conveyor 116 associated with the sorting station 110. Alternatively, an item handling assembly 148 associated with the system 100 may dispose the received items 120 on the conveyor 128 and/or the conveyor 116.

The system 100 may move the plurality of items 120 on the conveyor 128 in a direction Z' that is along or substantially parallel to the longitudinal axis E of the conveyor 128. For example, the controller 118 may control one or more rollers 108 of the conveyor 128 to rotate in, for example, a clockwise direction in order to move a plurality of items 120 supported by the conveyor 128 in the direction Z' toward the ramp 130. For example, the rollers 108 may comprise motor-driven rollers, and the controller 118 may control rotation of the rollers 108 such that the plurality of items 120 moves that a velocity equal to between approximately 60 inches/second and approximately 80 inches/second. The rollers 108 may be controlled to rotate at substantially constant speeds or, alternatively, the rollers 108 may be controlled to rotate at variable speeds during operation of the conveyor 128. Additionally, the system 100 may include one or more sensors 146 configured to detect at least one of the items 120, while the item 120 is disposed on the conveyor 116 or on the conveyor 128. Accordingly, in some examples, at least one of the sensors 146 may scan, sense, and/or otherwise detect at least one of the items 120 as the items 120 move substantially along the longitudinal axis E of the conveyor 116 and/or of the conveyor 128.

Once each item of the plurality of items 120 interfaces with the ramp 130, each item 120 may slidably engage a declined surface 228 of the ramp 130, and the declined surface 228 may transfer at least one item of the plurality of items 120 from the conveyor 128 to the tote 106*e* disposed on a top surface 208 of the platform 206. In some examples, at least one of the sensors 146 may scan, sense, and/or otherwise detect at least one of the items 120 disposed at least partially within the internal space 134 of the tote 106*e*. In examples in which one or more of the items 120 sensed by the sensor 146 is disposed proximate and/or adjacent to the bottom end 230 of the declined surface 228 so as to block and/or otherwise hinder one or more additional items 120 from being transferred into the tote 106*e*, the sensor 146 may send a signal to the controller 118, including information associated with the position of the sensed item 120. At least partly in response to such information, the controller 118 may stop the plurality of items 120 disposed on the conveyor 128. Additionally, in examples in which the sensor 146 scans, senses, and/or otherwise detects one or more items 120 disposed proximate and/or adjacent to the top end 304 of the inner surface 216, the sensor 146 may send a signal to the controller 118, including information associated with the position of the sensed item 120. At least partly in response to such information, the controller 118 may stop the rollers 108 in order to arrest the movement of the plurality of items 120 disposed on the conveyor 128. In any of the examples described here, the shape, size, orientation, weight, and/or other configurations of the individual items 120 may be sensed by one or more of the sensors 146 while the items 120 are on the conveyor 128 and/or while the items 120 are disposed within the tote 106*e*. In such examples, sensors 146 may send signals indicative of such configurations to the controller 118, and the controller 118 may increase or decrease the rotational speed of the rollers 108 based at least in part on such configurations. For example, if one or more of the rollers 108, sensors 146 and/or other components of the system determine that one or more items 120 disposed on the conveyor 128 has a mass less than a minimum mass threshold, the controller 118 may decrease the rotational speed of the rollers 108. In further examples, if one or more of the rollers 108, sensors 146 and/or other components of the system determine that one or more items 120 disposed on the conveyor 128 has a mass greater than a maximum mass threshold, the controller 118 may increase the rotational speed of the rollers 108.

In any of the example methods described herein, the platform 206 may position the tote 106*e* such that the top surface 212 of the base 210 extends at an angle θ', relative to the horizontal plane G, greater than approximately 5 degrees and less than approximately 10 degrees. In particular, the platform 206 may position the tote 106*e* such that the top surface 212 of the base 210 extends at an angle θ', relative to the horizontal plane G, equal to between approximately 6 degrees and approximately 8 degrees. Further, the top surface 208 of the platform 206 may be in contact with the bottom surface 214 of the base 210, and the top surface 208 of the platform 206 may also extend at the angle θ', relative to the horizontal plane G. In any of the examples described herein, the top surface 212 of the base 210 may comprise a declined surface of the tote 106*e*, and the top surface 212 may slope away from, for example, the conveyor 128. In particular, the platform 206 may position the tote 106*e* such that the top surface 212 of the base 210 slopes away from the conveyor 128 from a top end 236 of the top surface 212 to a bottom end 234 of the top surface 212. In such examples, the bottom end 234 is disposed closer to the support surface F than the top end 236. In particular, in such examples the bottom end 234 is spaced from the support surface F by a third substantially vertical distance, and the top end 236 is spaced from the support surface F by a fourth substantially vertical distance greater than the third substantially vertical distance. It is understood that in some examples, the support surface F may not be substantially horizontal. In such examples, the angular orientation, relative position, and/or other configurations of the conveyor 128, the platform 206, the ramp 130, the top surface 212, and/or other components of the systems 100 described herein may be modified based on the angle and/or other configurations of the support surface F. For example, in embodiments in which the support surface F is configured such that the conveyor 128 is angled downwardly toward the platform 206, the angle θ', relative to the horizontal plane G, may be decreased to achieve the results described above with respect to FIG. 4.

As noted above, positioning the various totes 106 of the present disclosure in this way may be advantageous at least because, the items 120*n* transferred from the conveyor 128 and into a respective tote 106*e* may be at minimal risk of falling out of the tote 106*e* before the tote 106*e* is moved away from the conveyor 128. Further, positioning the totes 106 in this way may result in the items 120*n* being substantially evenly distributed within the interior space 134 as the items 120*n* are transferred from the conveyor 128 to the tote 106*e*, and may assist in maximizing, on average, the number of items 120*n* disposed within the interior space 134 before the tote 106*e* is moved away from the conveyor 128. Accordingly, the risk of damage to such items 120*n* may be minimized, and the overall efficiency of the system 100 may be improved.

Accordingly, the example systems and methods of the present disclosure offer unique and heretofore unworkable approaches to handling items in order fulfillment environments. Such systems and methods reduce the costs associated with order fulfillment and improve efficiency.

CONCLUSION

Although the techniques have been described in language specific to structural features and/or methodological acts, it is to be understood that the appended claims are not necessarily limited to the features or acts described. Rather, the features and acts are described as example implementations of such techniques.

Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

The invention claimed is:

1. A system, comprising:

a first conveyor configured to convey a plurality of items;

a moveable shuttle configured to receive at least one item of the plurality of items from the first conveyor, the shuttle having one or more motorized wheels configured to move the shuttle between the first conveyor and a tote, the shuttle comprising a second conveyor having a longitudinal axis, the second conveyor being configured to:

support the at least one item during movement of the shuttle between the first conveyor and the tote, and move the at least one item along the longitudinal axis at least while the shuttle is stationary; and a carrier configured to support the tote over a support surface, wherein:

the tote includes a tote base having a top surface and a bottom surface opposite the top surface, the top surface defining at least part of an interior space of the tote, the top surface of the tote base includes a bottom end and a top end opposite the bottom end of the top surface, the carrier positions the tote such that the top surface of the tote base extends at an angle, relative to a horizontal plane, equal to between approximately 6 degrees and approximately 8 degrees, and the bottom end of the top surface is disposed closer to the support surface than is the top end of the top surface.

2. The system of claim 1, further comprising a ramp configured to support the at least one item as the at least one item is transferred from the second conveyor to the tote, the ramp including a declined surface having a bottom end adjacent to the tote and a top end adjacent to the second conveyor, wherein the bottom end of the declined surface is disposed closer to the support surface than is the top end of the declined surface, wherein the ramp is connected to, and moveable with, the shuttle, and the declined surface extends at an angle, relative to the horizontal plane, equal to between approximately 10 degrees and approximately 20 degrees.

3. The system of claim 1, wherein the second conveyor comprises a plurality of motor-driven rollers, each roller of the plurality of rollers:

extending substantially perpendicular to the longitudinal axis, and being rotatable in a clockwise direction and a counter-clockwise direction.

4. The system of claim 1, further comprising a sorting station configured to receive the plurality of items from a remote location, the sorting station including an item handling assembly configured to dispose the plurality of items received at the sorting station on the first conveyor.

5. The system of claim 1, further comprising a controller and a sensor operably connected to the controller, the sensor being configured to detect the at least one item disposed on the first conveyor, wherein the controller is configured to stop movement of the plurality of items at least partly in response to a signal received from the sensor.

6. A system, comprising:

a first conveyor configured to move a plurality of items disposed thereon;

a shuttle having one or more motorized wheels configured to move the shuttle between the first conveyor and a tote, the shuttle comprising a second conveyor being configured to receive and support at least one item of the plurality of items as the at least one item is transferred from the first conveyor to the tote; and a carrier configured to support the tote so that a top surface of a tote base of the tote is disposed at an angle offset from a horizontal plane by between 5 degrees and 10 degrees.

7. The system of claim 6, wherein the carrier includes a platform, and the tote is supported by a top surface of the platform.

8. The system of claim 7, wherein the top surface of the platform supports the tote such that the tote base extends at an angle, relative to the horizontal plane, equal to between approximately 6 degrees and approximately 8 degrees.

9. The system of claim 8, wherein the second conveyor is moveable with respect to a support surface over which the second conveyor is disposed.

10. The system of claim 7, wherein the first conveyor defines a longitudinal axis, and the second conveyor defines a longitudinal axis that remains substantially parallel with the longitudinal axis of the first conveyor throughout movement of the shuttle between the first conveyor and the tote.

11. The system of claim 6, wherein the tote further comprises a first sidewall, a second sidewall opposite the first sidewall, a third sidewall, and a fourth sidewall opposite the third sidewall, the first, second, third, and fourth sidewalls extending from the tote base and defining at least part of an interior space of the tote, the first sidewall having an inner surface facing the interior space, and an outer surface opposite the inner surface, and the outer surface having a top end opposite the tote base, the carrier positioning the tote such that the top end of the outer surface is disposed lower than the second conveyor when the shuttle is moved adjacent to the tote.

12. The system of claim 11, wherein the inner surface of the first sidewall extends at an included angle, relative to the top surface of the tote base, equal to between approximately 90 degrees and approximately 105 degrees.

13. The system of claim 6, wherein the second conveyor includes a plurality of rollers configured to support the at least one item, the plurality of rollers extending substantially perpendicular to a longitudinal axis of the second conveyor and being rotatable in clockwise and counterclockwise directions.

14. The system of claim 6, wherein the second conveyor is configured to move the plurality of items, relative to the shuttle and in a direction substantially parallel to a longitudinal axis of the second conveyor, at a velocity equal to between approximately 60 inches/second and approximately 80 inches/second.

15. The system of claim 6, further comprising a sensor configured to detect at least one of:

the plurality of items disposed on the first conveyor, and the tote disposed on the carrier.

16. The system of claim 6, further comprising a ramp disposed adjacent to the second conveyor and being configured to support the at least one item as the at least one item is transferred from the second conveyor to the tote, wherein the ramp includes a declined surface having a bottom end adjacent to the tote and a top end adjacent to the conveyor, the bottom end of the declined surface being closer to a support surface on which the carrier is disposed than is the top end of the declined surface, and the declined surface having a length equal to between approximately 1 inch and approximately 12 inches.

17. A method, comprising:

moving a plurality of items on a first conveyor in a direction substantially parallel to a longitudinal axis of the first conveyor;

transferring at least one item of the plurality of items from the first conveyor to a second conveyor of a shuttle, wherein the second conveyor is disposed over a support surface and defines a second longitudinal axis;

moving the shuttle carrying the at least one item to a position adjacent a tote, wherein moving the shuttle comprises driving one or more motorized wheels of the shuttle;

moving the second conveyor relative to the shuttle so as to convey the at least one item along the second longitudinal axis, thereby transferring the at least one item from the second conveyor to the tote;

supporting the tote with a platform disposed over the support surface, wherein:

the tote includes a tote base having a top surface defining at least part of an interior space of the tote, the top surface of the tote base includes a bottom end and a top end opposite the bottom end of the top surface, the platform positions the tote such that the top surface of the tote base extends at an angle, relative to a horizontal plane, greater than approximately 5 degrees and less than approximately 10 degrees, and the bottom end of the top surface is disposed closer to the support surface than is the top end of the top surface.

18. The method of claim 17, wherein the second conveyor includes a plurality of motor-driven rollers, and moving the at least one item on the second conveyor includes rotating the plurality of rollers in a clockwise direction or a counterclockwise direction such that the at least one item moves at a velocity equal to between approximately 60 inches/second and approximately 80 inches/second relative to the shuttle.

19. The method of claim 17, further comprising detecting an item disposed at least partly within the interior space, and stopping movement of the at least one item on the second conveyor at least partly in response to the sensing.

20. The method of claim 17, further comprising:

receiving the plurality of items from a remote location;

disposing the plurality of received items on the first conveyor and substantially along the longitudinal axis; and detecting the at least one item while the at least one item is disposed on the first conveyor.

* * * * *